Dec. 16, 1969   R. J. BOISSE   3,484,329
METHOD OF PRODUCING A DECORATIVE MATERIAL AND
ARTICLE PRODUCED BY SAID METHOD
Filed Jan. 5, 1967

INVENTOR
Ronald J. Boisse

BY Karl W. Flocks

ATTORNEY

United States Patent Office 3,484,329
Patented Dec. 16, 1969

3,484,329
METHOD OF PRODUCING A DECORATIVE MATERIAL AND ARTICLE PRODUCED BY SAID METHOD
Ronald J. Boisse, Pawtucket, R.I., assignor to Mr. Christmas, Inc., Esmond, R.I., a corporation of New York
Filed Jan. 5, 1967, Ser. No. 607,452
Int. Cl. B32b 3/10; A47g 33/08
U.S. Cl. 161—12
4 Claims

ABSTRACT OF THE DISCLOSURE

This disclosure is related to an improved method and decorative material in which an improved multi-color material can be produced and in which marginally overlapped strips of material are retained by substantially concealed, helically twisted retaining elements.

---

This invention relates generally to decorative material used to produce artificial tree branches, garlands, wreaths, sprigs, and the like, and the method for producing the same.

Typical apparatus for producing decorative material of the general character involved is disclosed in the U.S. Letters Patent to Kranz et al., No. 2,072,560, issued Mar. 2, 1937, or Schneider, No. 1,680,303, issued Aug. 14, 1928.

Primary objects of the present invention are to provide a novel method and decorative material produced by the same, in which the material includes a minimum amount of material and has different colors along its length regardless of the angle from which it is viewed, and more specifically, to provide a novel method including marginally overlapping of the inner edges of at least a pair of flexible strips of sheet material and passing the same through the nip of a pair of rollers, simultaneously cutting the strips of material outwardly from marginal overlapped inner edges through the outer marginal edges of the strips and forming a series of fringe edges longitudinally of the strips while feeding a pair of twistable-retaining elements through the rollers in overlying relation on opposite sides of the marginally overlapped inner edges of the strips and simultaneously twisting said retaining elements into a helical form and pitched to form a helical decorative material and forming a longitudinal core substantially hiding the twistable-retaining elements.

A further more specific object, in conformance with that set forth above, is to provide in the novel method the step of producing said strips with one surface differing from the opposite surface, and orienting the strips in reversed color relationship with respect to each other, whereby helically twisting of the strips and retaining elements produce a decorative material which appears to have at least two colors parallel to its length when viewed from any angle.

A still further object of the present invention is to provide a novel decoration material comprising two elongated strips of sheet material having marginally overlapped inner edges and different colors on opposite sides, and in which said elongated strips are helically twisted at their marginally overlapped edges by means of overlapped retaining elements and include separate fringe elements extending from the marginally overlapped portions out and through the outer marginal edges of the strips.

These, together with objects and the nature of the invention, will become apparent from a consideration of the specification when taken in conjunction with the drawings forming a part thereof, and in which.

Figure 1:
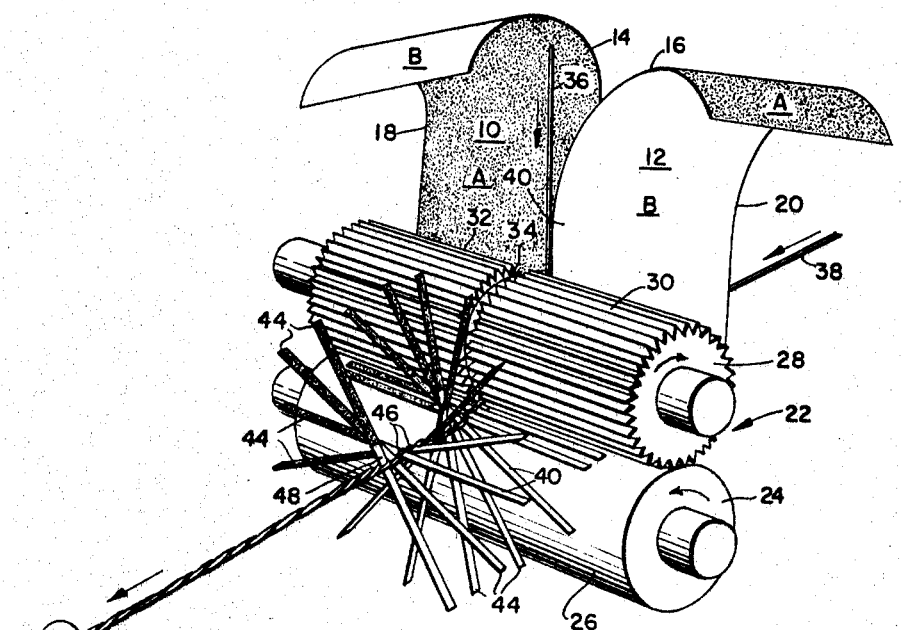
FIG. 1 is a diagrammatic perspective view illustrating how the decorative material is produced.

Referring first to FIG. 1, a pair of strips of sheet material 10 and 12 are produced from vinyl, metal foil, paper or the like and include the inner marginal edges 14 and 16, respectively, and outer marginal edges 18 and 20, respectively. The strips of material 10 and 12 preferably include, when produced, different colored surfaces A and B on opposite sides, these colors being produced in any suitable manner.

A pair of rolls indicated generally at 22 are suitably journaled and rotated in the direction indicated, by suitable apparatus (not shown). The pair of rolls 22 include a base roll 24 having a smooth, uninterrupted base surface 26, and a cutting roll 28, the latter including two series of circumferentially spaced, radially extending series of cutting blades 30 and 32 separated by an intermediate annular groove 34. The blades 30 and 32 will function to produce a series of longitudinally extending fringe elements on the sheets of decorative material on opposite sides of the annular groove 34.

Figure 2:
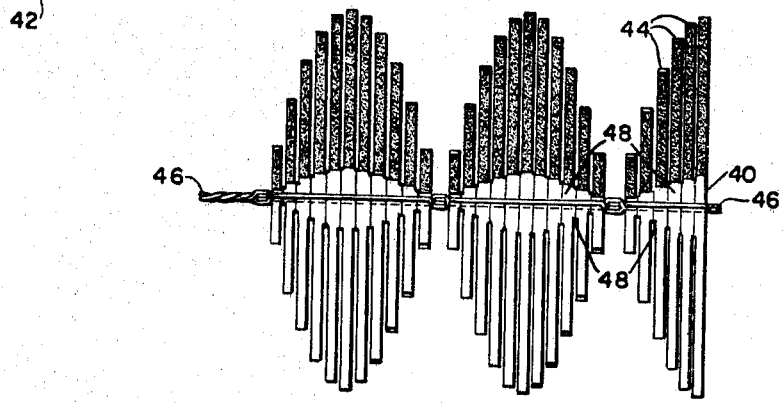
FIG. 2 is a plan view of the decorative material produced according to the novel method.
Figure 3:
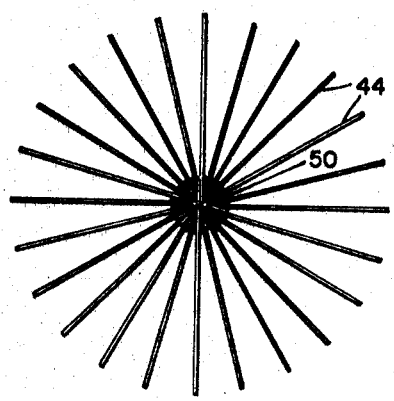
FIG. 3 is an end elevational view looking substantially from line 3—3 of FIG. 2.

A pair of twistable-retaining elements 36 and 38 and comprising cord, wire, etc. will be disposed on opposite sides of the strip elements 10 and 12, i.e. overlying a marginally overlapped portion indicated at 40 in FIG. 2.

Strips of material 10 and 12 are supported on suitable supply rolls (not shown), as are the twistable-retaining elements 36 and 38. The downstream end 42 of the twistable-retaining elements is suitably connected to twisting mechanism, and the rate of twisting in relation to the speed of rotation of the rolls 24 and 28 may be controlled.

The strip elements 10 and 12 are preferably reversely colored on opposite sides and the novel method facilitates the production of an endless decorative material from minimum width material, i.e. single plies marginally overlapped at 40, whereafter twisting of the elements 36 and 38 substantially camouflages or hides the twisted retaining elements.

Referring particularly to the method involved, the elements 10 and 12 are marginally overlapped at 40, and the retaining elements 36 and 38 are disposed in overlying relationship with respect to the marginally overlapped portion 40. It will be noted that the annular groove 34 in the roll 28 permits the twistable-retaining elements 36 and 38 to be readily helically twisted without impeding the movement of the retaining elements through the nip or overlying portions of the rolls 24 and 28. The blades 32 and 30 of the roll 28 are disposed in substantially engaging relationship with the outer surface 26 of the roll 24 whereby, as the strip elements 10 and 12 are moved through the overlying rolls, a plurality of fringe elements 44 outwardly of the marginally overlapped portions are produced. The annular groove 34 forms intermediately the marginal overlapped portion 40 an uncut portion indicated generally at 46, while the portions of the strips at the inner marginal edge will be provided with relatively short length fringe elements 48. As the elements 36 and 38 are helically twisted, as indicated diagrammatically in FIG. 1, and if the rate at which the helices are formed, along the longitudinal axis of these elements, is less than the peripheral speed of the rolls, the groups of fringe 44 and 48 will be bunched within the vehicles and accordingly produce a relatively thick appearing core 50 along the longitudinal axis of the decorative strip material being produced.

As previously mentioned, the strips of material 10 and 12 will have opposite sides thereof produced with different colors. This different coloring produces an unusual effect inasmuch as the utilization of just two sheets of material 10 and 12 will result in a continuous color extending along the decorative material regardless of which side is being viewed.

Additionally, the center portion of the decoration material, even when using just two sheets of decoration material, will have a two-ply thickness and the marginal overlap accordingly strengthens the completed product; however, the decoration material is still produced with two colors and through the use of a minimum amount of material.

As previously mentioned, the strips of material 10 and 12 can be produced from any suitable material and likewise the retaining elements can be produced from wire, cord, thread, etc.

What is claimed is:

1. In a method of producing artificial decoration materials, the steps including
   (a) marginally overlapping inner edges of at least a pair of flexible strips of sheet material and passing them through the nip of a pair of rollers;
   (b) simultaneously cutting said strips of material outwardly of said marginal overlapped inner edges and through both marginal edges of said strips and forming a series of fringe elements longitudinally along said strips and producing an uncut longitudinal strip extending along an intermediate portion of the marginal overlap;
   (c) feeding a pair of twistable-retaining elements through said rollers in overlying relation on opposite sides of said marginal overlapped inner edges of said strips and on opposite sides of the uncut portion, and simultaneously twisting said twistable-retaining elements into a helical form to a pitch effective to form a helical decorative material with the twistable-retaining elements substantially hidden.

2. The method of claim 1 including the step of producing said strips with one surface differing in color from the opposite surface;
   orienting said strips, before entering said rolls, with the color of one strip reversed with respect to that of the adjacent overlaping strips whereby twisting of said strips and retaining elements produces a decoration material which appears to have at least two colors parallel to its length when viewed from any angle.

3. A decorative material comprising two elongated strips of sheet material having inner and outer marginal edges, said elongated strips of sheet material being marginally overlapped at the inner edges and a plurality of separate fringe elements extending outwardly from said marginally overlapped inner edges to both the outer and inner margin of said strips, said overlapped strips having an uncut portion extending longitudinally thereof between the fringe elements, and a pair of retaining elements disposed on opposite sides of the uncut portion of said marginally overlapped inner edges, said retaining elements being helically twisted along their longitudinal axis and correspondingly helically twisting said sheets of strip material and forming a decoration material appearing to have a relatively large central core substantailly camouflaging said retaining elements.

4. A decoration material as claimed in claim 3 in which said strips of sheet material have different colors on opposite sides and said decoration material appears to have at least two colors parallel to its longitudinal axis.

References Cited

UNITED STATES PATENTS

| 1,680,303 | 8/1928 | Schneider | 161—12 XR |
| 2,072,560 | 3/1937 | Kranz et al. | 161—12 XR |
| 2,234,338 | 3/1941 | Franke | 161—12 XR |
| 3,215,047 | 11/1965 | Braun | 93—1.5 |

JOHN T. GOOLKASIAN, Primary Examiner

H. F. EPSTEIN, Assistant Examiner

U.S. Cl. X.R.

57—143; 93—1.5; 156—148; 161—145